United States Patent
Baskett et al.

(10) Patent No.: US 10,268,639 B2
(45) Date of Patent: Apr. 23, 2019

(54) JOINING LARGE DATABASE TABLES

(71) Applicant: Inpixon, Palo Alto, CA (US)

(72) Inventors: Chris Baskett, Belmont, CA (US);
Tony Faustini, Berkeley, CA (US);
Farzin Shakib, Los Altos Hills, CA (US)

(73) Assignee: Inpixon, Palo Alto, CA (US)

( * ) Notice: Subject to any disclaimer, the term of this patent is extended or adjusted under 35 U.S.C. 154(b) by 0 days.

(21) Appl. No.: 14/218,912

(22) Filed: Mar. 18, 2014

(65) Prior Publication Data

US 2014/0280024 A1 Sep. 18, 2014

Related U.S. Application Data

(60) Provisional application No. 61/800,126, filed on Mar. 15, 2013.

(51) Int. Cl.
*G06F 16/00* (2019.01)
*G06F 16/2455* (2019.01)
(Continued)

(52) U.S. Cl.
CPC ...... *G06F 16/2456* (2019.01); *G06F 16/2237* (2019.01); *G06F 16/2453* (2019.01); *G06F 16/24544* (2019.01); *G06F 16/24547* (2019.01)

(58) Field of Classification Search
CPC ......... G06F 17/30466; G06F 17/30471; G06F 17/30489; G06F 17/30463; G06F 17/30501; G06F 17/30457; G06F 9/546; G06F 16/24547; G06F 16/8365; G06F 16/8373; G06F 16/2237; G06F 16/2453; G06F 16/24544; G06F 16/2456
See application file for complete search history.

(56) References Cited

U.S. PATENT DOCUMENTS 5,548,758 A 8/1996 Pirahesh et al.
5,557,791 A * 9/1996 Cheng ............... G06F 17/30498
(Continued)

OTHER PUBLICATIONS

Priti Mishra et al., "Join Processing in Relational Databases", Computer Sczence & Engineering Department, Southern Methoclmt Un z.erszty, Dallas, Texas, ACM Computmg Surveys, vol. !24, No. 1, Mar. 1992, pp. 63-113.*
(Continued)

*Primary Examiner* — Srirama Channavajjala
(74) *Attorney, Agent, or Firm* — Pillsbury Winthrop Shaw Pittman LLP

(57) ABSTRACT

Techniques to process a query and perform a join of tables that are distributed across nodes of a network. The join can be performed by analyzing a Where clause. An active flag structure can have flag values that identify table entries satisfying criteria of the Where clause. Keys of surviving entries of a first table can be used to generate a request for a second table to be joined. The request can be for second flags for the second table when the Where clause has criteria for the second table. A response can be used to update the first flags to change a first flag to False. After updating, data can be retrieved for first flags that are True. Requests can use identifiers associated with the first table that identify a location for sending the request, e.g., using RDMA or MPI.

21 Claims, 11 Drawing Sheets

(51) Int. Cl.
*G06F 16/2453* (2019.01)
*G06F 16/22* (2019.01)

(56) References Cited

U.S. PATENT DOCUMENTS

| | | | | |
|---|---|---|---|---|
| 5,666,525 A * | 9/1997 | Ross | ............ | G06F 17/30498 |
| 5,758,335 A * | 5/1998 | Gray | ............ | G06F 17/30471 |
| 5,812,840 A * | 9/1998 | Shwartz | ............ | G06F 17/30392 |
| 6,112,209 A * | 8/2000 | Gusack | ............ | G06F 16/284 |
| 6,167,399 A * | 12/2000 | Hoang | ............ | G06F 17/30324 |
| 6,338,095 B1 * | 1/2002 | Yasuda | ............ | G06F 9/544 |
| | | | | 370/351 |
| 6,349,310 B1 * | 2/2002 | Klein | ............ | G06F 16/2282 |
| | | | | 707/703 |
| 6,397,227 B1 * | 5/2002 | Klein | ............ | G06F 16/2379 |
| 6,415,332 B1 * | 7/2002 | Tuel, Jr. | ............ | G06F 9/4843 |
| | | | | 718/100 |
| 6,439,783 B1 * | 8/2002 | Antoshenkov | ..... | G06F 17/30433 |
| 6,453,313 B1 * | 9/2002 | Klein | ............ | G06F 16/2448 |
| 6,470,331 B1 * | 10/2002 | Chen | ............ | G06F 16/24532 |
| | | | | 707/718 |
| 6,505,189 B1 | 1/2003 | On Au et al. | | |
| 6,618,720 B1 * | 9/2003 | On Au | ............ | G06F 17/30498 |
| 6,643,636 B1 | 11/2003 | Au et al. | | |
| 6,732,096 B1 * | 5/2004 | Au | ............ | G06F 17/30489 |
| 7,620,620 B1 * | 11/2009 | Sedlar | ............ | G06F 17/30233 |
| 7,640,244 B1 | 12/2009 | Morris et al. | | |
| 7,702,619 B2 | 4/2010 | El-sabbagh | | |
| 7,877,372 B1 * | 1/2011 | Lopes | ............ | G06F 16/24532 |
| | | | | 707/713 |
| 7,912,833 B2 | 3/2011 | Gui et al. | | |
| 8,073,840 B2 | 12/2011 | Smith et al. | | |
| 8,103,658 B2 | 1/2012 | Flatz et al. | | |
| 8,150,836 B2 | 4/2012 | Xu et al. | | |
| 8,290,935 B1 * | 10/2012 | Lopes | ............ | G06F 16/2453 |
| | | | | 707/718 |
| 8,396,860 B1 * | 3/2013 | Ramesh | ............ | G06F 16/24537 |
| | | | | 707/713 |
| 8,694,525 B2 | 4/2014 | Christie et al. | | |
| 8,990,186 B2 | 3/2015 | Ma et al. | | |
| 2002/0129172 A1 * | 9/2002 | Baskey | ............ | G06F 9/544 |
| | | | | 719/310 |
| 2002/0143521 A1 * | 10/2002 | Call | ............ | G06F 17/2247 |
| | | | | 704/1 |
| 2003/0115162 A1 * | 6/2003 | Konick | ............ | G06Q 10/08 |
| | | | | 705/404 |
| 2005/0021503 A1 * | 1/2005 | Chiang | ............ | G06F 17/30463 |
| 2005/0283501 A1 * | 12/2005 | Blaicher | ............ | G06F 16/2365 |
| 2007/0061288 A1 * | 3/2007 | Fuh | ............ | G06F 17/30466 |
| 2007/0288459 A1 * | 12/2007 | Kashiyama | ....... | G06F 17/30286 |
| 2008/0033914 A1 * | 2/2008 | Cherniack | ......... | G06F 17/30457 |
| 2008/0082540 A1 * | 4/2008 | Weissman | ........... | G06F 21/6227 |
| 2008/0270489 A1 * | 10/2008 | Kharatishvili | ...... | G06F 16/2379 |
| 2009/0254518 A1 | 10/2009 | El-sabbagh et al. | | |
| 2010/0036799 A1 | 2/2010 | Bouloy et al. | | |
| 2010/0057672 A1 | 3/2010 | Zhou et al. | | |
| 2010/0088309 A1 | 4/2010 | Petculescu et al. | | |
| 2013/0185280 A1 | 7/2013 | Ma et al. | | |
| 2013/0311444 A1 | 11/2013 | Samwel et al. | | |
| 2014/0181077 A1 | 6/2014 | Al-kateb et al. | | |
| 2014/0280024 A1 * | 9/2014 | Baskett | ............ | G06F 17/30498 |
| | | | | 707/714 |
| 2015/0149472 A1 * | 5/2015 | Lee | ............ | G06F 16/2255 |
| | | | | 707/741 |

OTHER PUBLICATIONS

MPI-2: Extensions to the Message-Passing Interface, Message Passing Interface Forum, Nov. 15, 2003, pp. 1-356.*

* cited by examiner

| Table | Column | Type | Size | Note |
|---|---|---|---|---|
| Customer | c_custkey | Identifier (long) | 8 bytes | Primary key |
| Customer | c_mktsegment | Char | 10 bytes | Text |
| Order | o_orderkey | Identifier (long) | 8 bytes | Primary key |
| Order | o_custkey | Identifier (long) | 8 bytes | Foreign key to c_custkey |
| Order | o_orderdate | Date | 4 bytes | Date |
| Order | o_shippriority | Integer | 4 bytes | |
| Lineitem | l_orderkey | Identifier (long) | 8 bytes | Foreign key to o_orderkey |
| Lineitem | l_shipdate | Date | 4 bytes | Date |
| Lineitem | l_extendedprice | Decimal (double) | 8 bytes | Value |
| Lineitem | l_discount | Decimal (double) | 8 bytes | Value |

JOINING LARGE DATABASE TABLES

CROSS-REFERENCES TO RELATED APPLICATIONS

The present application claims priority from and is a nonprovisional application of U.S. Provisional Application No. 61/800,126, entitled "Systems And Methods Using High Performance Computing Technology To Join Large Database Tables" filed Mar. 15, 2013, the entire contents of which are herein incorporated by reference for all purposes.

BACKGROUND

Data creation is increasing exponentially and at the same time the demand for data mining and analysis is exploding. Current data mining solutions cannot keep up with the growing data deluge. Organizational decision makers face an arduous or impossible task in achieving high quality data-driven insights using tools that are not well suited to big data. Existing tools currently are not equipped to take advantage of emerging high performance computing technology.

One problem area is performing a query that requires joining two tables. Current techniques do not perform the join efficiently, and may not scale well with the number of tables to be joined in the query. Additional problems can arise when a node of a distributed database goes offline.

Embodiments can address these and other problems.

BRIEF SUMMARY

Embodiments provide systems, apparatuses, and methods for processing a query and performing joins of database tables that are distributed across computer nodes of a network cluster. The query can be performed by optionally analyzing a Where clause as it pertains to each of the tables. An active flag structure can have flag values that identify table entries satisfying criteria from the Where clause. Keys of surviving entries of a first table can be used to generate a request for a second table to be joined (by going from the FK (foreign key) to the PK (primary key)). A response can be used to update the first flags to change a first flag to False, where a response can be a lack of information for a particular key. In addition, a location of a remote row can be brought back and stored associated with active flag structure (e.g., stored in another column adjacent to an active flag column). After updating, data can be retrieved for first flags that are True.

In one embodiment, the request for a remote PK can respect the possible active flag analysis already done on the second table, and not bring back rows that have failed the Where criteria. In another embodiment, if the remote row does not exist, or has failed a previously run Where clause (and thus has an Active Flag set to False), then the flag in the first table can be set to False.

Some embodiments can use direct memory access between computer nodes. Other embodiment can use point-to-point communications or combinations of both. For example, requests can use identifiers associated with the first table that identify a location for sending the request, e.g., using remote direct memory access (RDMA) or Message Passing Interface (MPI).

Further, the distribution of a table across nodes can be handled with a fault tolerant algorithm. For example, an array that is larger than the number of nodes can be populated with node identifiers according to a distribution, e.g., a uniform distribution so as to load balance. When a node goes offline, the array can be updated, and related hash tables do not need to be updated.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 4 shows information for columns of tables and types used in the example query.

DEFINITIONS

A "node" (also referred to as a computer node) includes a processor and memory that is associated with that node (e.g., on a same circuit board as the processor). Examples of a node are a socket and a server computer. In some embodiments, the memory of a first node can be directly accessed by a second node, even though the memory is associated with the first node. In some cases a computer node can have a many processors, i.e., 8 or even 128.

Criteria can be explicit instructions that are used to identify entries that do not survive (satisfy) the criteria and entries that do survive the criteria. Criteria can also specify a use of all table entries, e.g., using a wildcard. A lack of any explicit restriction can also be taken as a criteria to use all entries.

An active flag structure can be a column of flags (e.g., a bit) that each indicate a status of a respective entry (e.g., a row) of a table. As another example, an active flag structure can be an index that only identifies entries that have a status of True.

A global ID structure can provide an ID for all or a portion of entries of a table, e.g., only for entries that have a flag value of True. The IDs can be locations for obtaining additional data for an entry, e.g., from a different table. The IDs can be of various forms, such as node that stores the corresponding data in the different table, a node and a row number, and a memory address of the data in global memory (e.g., RAM) that can be associated with a different node, thereby allowing direct access to that global memory.

DETAILED DESCRIPTION

Embodiments can provide techniques for performing joins for tables distributed across computer nodes of a network. Flags can be used to determine entries of an anchor table that satisfy all of the constraints before combining data into a result table.

I. System

Figure 1:
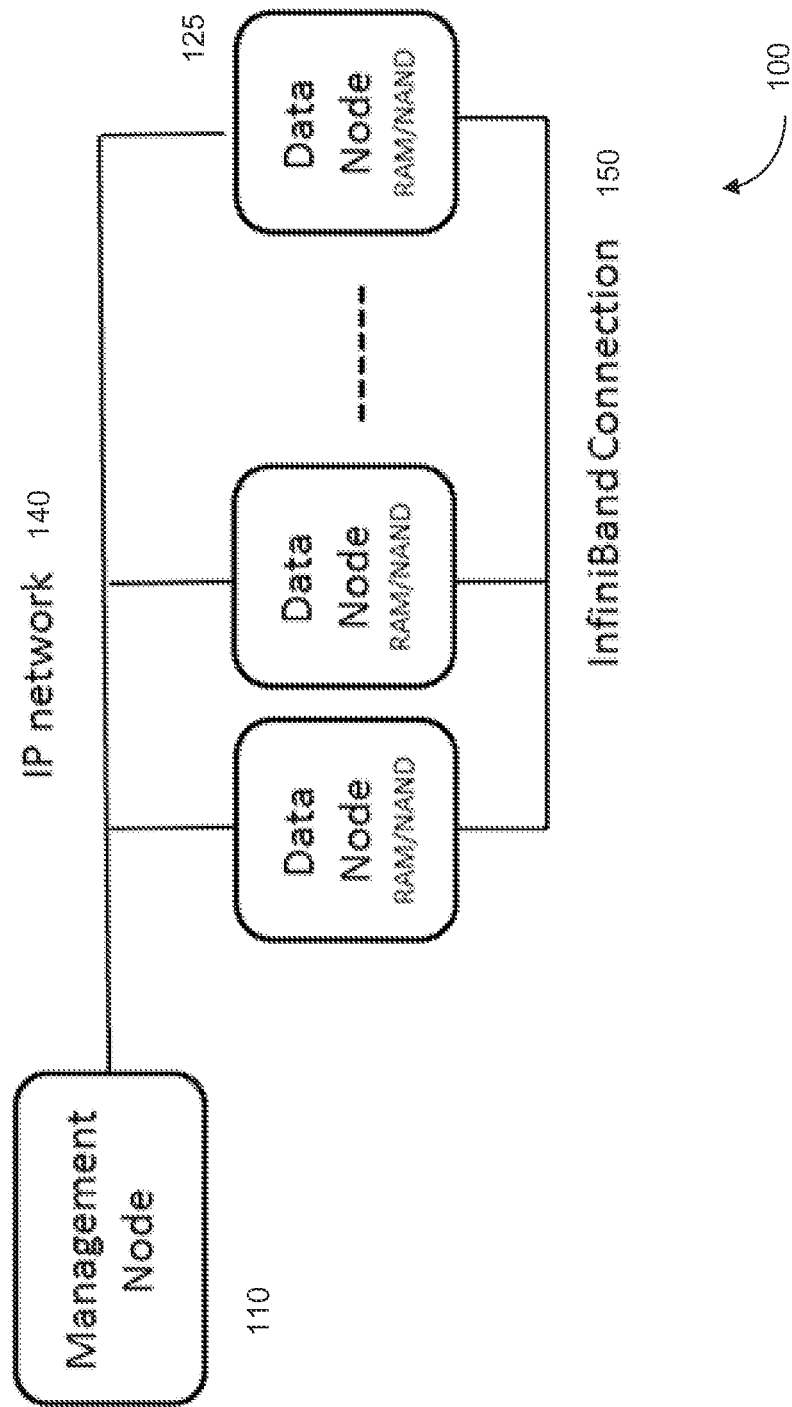
FIG. 1 shows a high performance computer system 100 according to embodiments of the present invention.

FIG. 1 shows a high performance computer system 100 according to embodiments of the present invention. System 100 includes of a management node 110 and a cluster of one or more data nodes 125 connected to management node 1120 by an IP network 140. As shown data nodes 125 are connected to each other for computing purposes by a high speed communications network 150 (e.g., InfiniBand). IP network 140 and high speed communications network 150 can be the same type of network. For example, IP network 140 can be an InfiniBand connection.

Each data node can have very large amounts of directly addressable storage. In various embodiments, the directly addressable storage is RAM, NAND, or a combination of RAM and NAND. Each node can have storage that is local to that node. In some embodiments, this storage can be accessed by any of the data nodes without having to interrupt a processor of a node. For example, a first node can request data from storage that is local to another node. Embodiments can use Remote Direct Memory Access (RDMA) for the direct access of memory of another node.

Partitioned Global Address Space (PGAS) can partition the memory of each node into local and global partitions. PGAS can take the normal allotment of RAM and divide it into Local RAM and Global RAM. This division can be done by the user setting up a system and then each single node allocates a part of it's RAM for local use and a part of it is global use. Local and global NAND can also be created. Local memory can be used by the local machine for its processing while the global memory can be directly accessed by other nodes. In some embodiments, only a small percent is local and the bulk is global.

Thus, embodiments can use some of the RAM and/or NAND in a global space accessible across multiple machines. This Global RAM/NAND combination enables massive amounts of pinned memory. By pinning memory using PGAS, it is possible to know exactly where a piece of data is stored, whether you have one machine or a thousand machines. GPI (Global Address Space Programming Interface) is an implementation of PGAS. Global hardware pointers can be used to allow for near instantaneous inter-nodal communication. In addition, being able to efficiently get remote data allows for interoperability between disparate data models.

Global memory can be partitioned in the PGAS space, e.g., in the database system through Global Row Identifiers (GRIDs). These identifiers can allow constant time access to a row from an external machine through the Infiniband or other efficient switch through the PGAS RDMA process. This concept can be extended over NAND, and pointers can be exchanged that allow direct access from a remote machine to another to the allotment of NAND reserved for Global use.

For example, if you have an XML document it can contain a reference to the LastName field of the 9th customer in the Customer table. When processing the XML document embodiments can use global hardware pointers to access the LastName column of the customer table with an offset of 9. The process can have a similar computational effort as accessing the 9th element of an array.

A node can have multiple processors. Thread parallelization can occur within a node (e.g., using OpenMP, Cilk+, etc.). The different nodes can communicate and perform an operation (e.g., a query) using various parallelization techniques, such as MPI, GPI, etc.

A. Loading Data

Management node 110 can receive a large table and distribute the entries (e.g., rows) of a table across data nodes 125. Such distribution may occur when a table is too big for a single computer node. The distribution can also allow parallelization of an operation. Small tables may be duplicated on each node. A loaded data set can be referred to as the main or permanent tables of the database. Auxiliary data structures, such as mapped indices, B-trees, and hash tables, can be created on a temporary or permanent basis. The database can also store individual queries and related data structures.

When a data set is initially loaded, it can be stored into columns associated with a table. For example, the employees of a company may form a table consisting of the employee's first name, last name, employee id, etc. Each of the fields (e.g., employee's first name) forms a column and a set of columns corresponds to a table like the employee table. The fields of a column may be stored sequentially in a column store. Embodiments can use tables with fixed width columns. Embodiment can be used for tables stored as rows (row stores) and to tables stored as columns (column stores).

Figure 2:
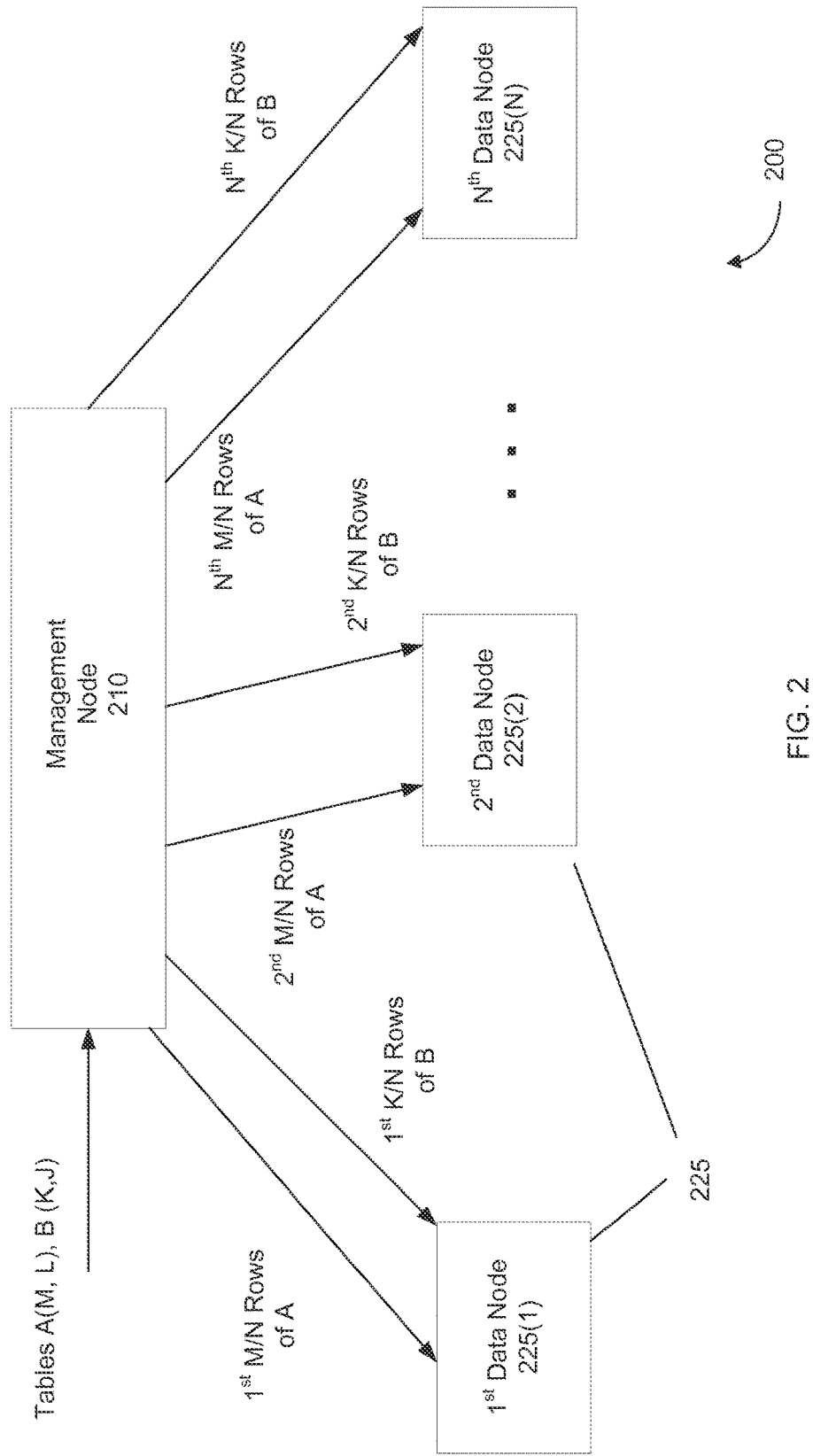
FIG. 2 shows a system 200 for partitioning a table among a plurality of data nodes 225 according to embodiments of the present invention.

FIG. 2 shows a system 200 for partitioning a table among a plurality of data nodes 225 according to embodiments of the present invention. As described above, embodiments can store a table in a distributed manner across the nodes of the system. PGAS can be used to create a global partition in memory of each node. Certain rows of a table can be assigned to a particular node for storage in the global partition for that particular node. Global Row Identifiers (GRIDs) can be stored at each node to identify where any row is stored among all of the nodes. In this manner, each node can access data from any of the other nodes without having to send a specific request to the operating system of a node.

If each node stores this part of the table in a column store format, the identifiers can specify the memory address of a column for the part of the table at that node. Thus, column entries can be accessed explicitly and quickly. Compression schemes may be used in storing the columns, e.g., to take advantage of repetitive values within a column.

FIG. 2 shows management node 210 receiving a table A having M rows and L columns, and receiving a table B having K rows and J columns. Management node 210 can determine which nodes will store which data from the tables. Various algorithms can be used to allocate the rows of the tables to nodes 225. Both tables may be distributed among all the nodes are only some of the nodes.

In the example shown, the rows of tables A and B are distributed uniformly among the N nodes 225. If M and K are divisible by N, then each node can have the same number of rows. Specifically, a first block of consecutive rows of the tables are stored in first data node 225(1). As shown, rows 1 to M/N (or equivalently 0 to M/N−1) of table A are stored on first data node 225(1). Similarly, rows 1 to K/M of table B are stored on first data node 225(1). And, second data node 225(2) stores rows M/N+1 to 2M/N of table A, and so on up to 225(N).

In this simple example, management node 210 would know the total values for M and K, and the number of rows would need to not change to have this exact structure. Other algorithms may be used in assigning a row to a particular node. In one embodiment, a primary key (pk) of a table may be used in determining which node is to store that row.

B. Distribution of Data

The primary key can be used to define a mapping that evenly distributes the rows of a table across the nodes of the cluster. This can be done by defining a function that maps primary keys to nodes where N is the number of nodes in the cluster. Such a mapping function can be represented as node_id=get_node_id(pk).

In one embodiment, get_node_id(pk):=pk % N. This function takes the remainder of pk divided by N, i.e., pk modulo N. If pk was a sequential set of numbers, this function would allocate the rows in a round-robin fashion. When pk is not a numerical value, they can be converted to a numerical value before performing the function, e.g., using hexadecimal or other base numbers according to what characters are used.

Another mapping function can be used, which can handle fault tolerance. If a node becomes unavailable, then the rows for that node should be distributed among the other nodes. However, this cannot be easily done using only the modulo mapping function.

In one implementation, an array node_map[ ] can be created which is several times the size of the number of nodes in the cluster. The size of the array can be represented as node_map_size. This array can be populated using a uniform distribution with random numbers between 0 and N−1. We can then use this to define the function:

$$Pk2Node(x)=node\_map[pk \% node\_map\_size]$$

Figure 3A:
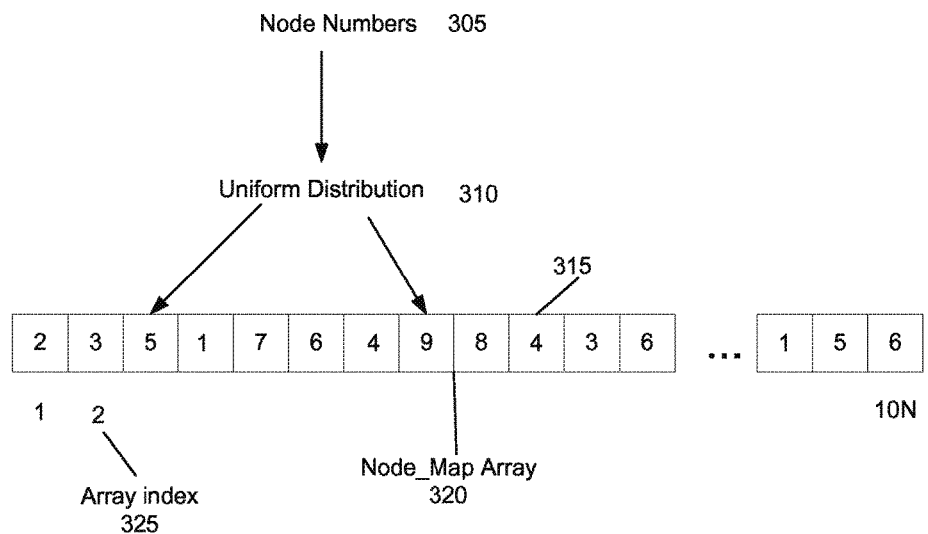
FIG. 3A shows the distribution of nodes among a node_map array 320 according to embodiments of the present invention.

FIG. 3A shows the distribution of nodes among a node_map array 320 according to embodiments of the present invention. In this example, the number of nodes is taken as 10, for ease of illustration. The node_map array has a length of 10 times N. Each array index 325 in node_map array 320 stores a value between 1 and 10. A random value between 1 and 10 can be assigned to each array index 325. In another embodiment, the assigned values can be tracked to ensure a uniform distribution. In this example, the first array value corresponds to node 2. Accordingly, the numbers 305 can be randomly assigned with a uniform distribution 310 to node map array 320.

Figure 3B:
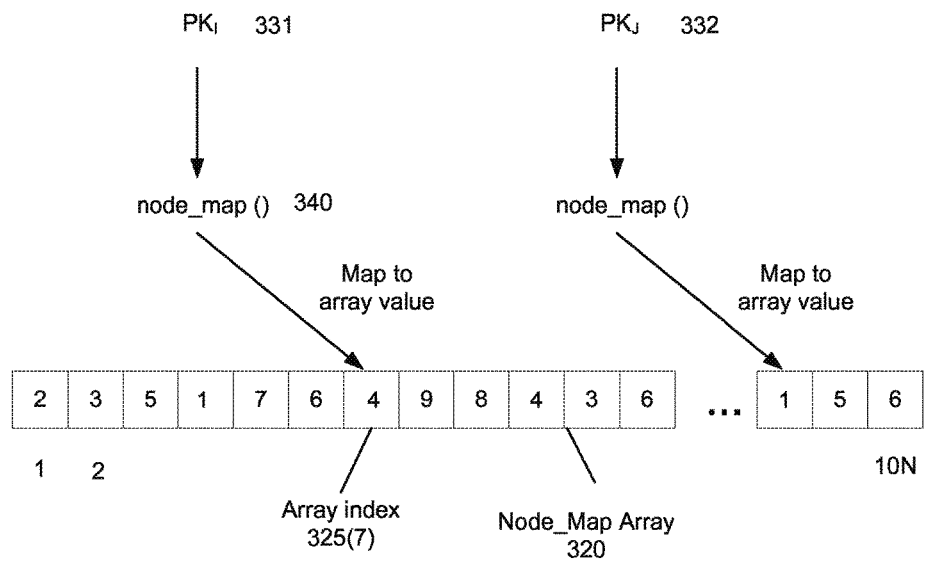
FIG. 3B shows usage of node_map array 320 according to embodiments of the present invention.

FIG. 3B shows usage of node_map array 320 according to embodiments of the present invention. A node_map function 340 can receive a primary key 331 and map it to array index 325(7), which stores the value 4. Thus, primary key 331 would map to node 4. And, primary key the city to would map to node 1.

If one of the nodes in the cluster is taken out of service due to repair or a crash, embodiments can provide a mechanism to continue computation when a fault is encountered. If a node is lost, a node can search node_map array 320 and replace all references to the lost node with existing healthy nodes. For example, if ten array values have 4 and node 4 goes offline, then array values with 4 can get new numbers. Each of the 10 array values can get a different number so that the rows are evenly distributed. In this manner, the node_map function can stay the same.

This can be done in a random and uniform way. Then for each table, the lost node's rows can be retrieved from secondary storage (disk) and copied to the newly mapped nodes. This provides a high degree of fault tolerance without excessive duplicate storage. This means the system is simple, fast and fault-tolerant.

The modulo function can still be used to properly select a particular value within node_map array 320. Thus, the number primary keys can be far larger than the size of node_map array 320.

II. Query and Active Flag

To evaluate an SQL statement, it can be broken down into various components (clauses) of the statement. These components are typically WHERE, JOIN, CALCULATE, GROUP BY, ORDER BY, and SELECT. To evaluate these query components a set of Plan Nodes is created, which are execution blocks. Typically a query optimizer creates a network of plan nodes that efficiently executes the user query on the underlying hardware. Embodiment can be used for tables stored as rows (row stores) and to tables stored as columns (column stores).

To execute a query in a column store, embodiments can first execute the WHERE component, which reduces the size of the search space that the other parts of the query need to analyze. If table statistics (indicating a histogram of table values—essentially the distribution of data from min to max value) are available and updated, then a simple heuristic can be used to estimate if the where or join should be accomplished first. A Where component can specify criteria that only some of the rows might satisfy. If there is no WHERE part, then the query would apply equally to all rows/columns of a table. Below, the description is focused on a method for efficiently implementing a join across a cluster of machines. The methodology also works on a single machine.

A. Example Query

An example SQL query is as follows:
select
    l_orderkey,
    sum(l_extendedprice*(1−l_discount)) as revenue,
    o_orderdate,
    o_shippriority
from
    customer,
    orders,
    lineitem
where
    c_mktsegment='BUILDING'
    and c_custkey=o_custkey
    and l_orderkey=o_orderkey
    and o_orderdate<date '1995-03-15'
    and l_shipdate>date '1995-03-15' group by
    l_orderkey,
    o_orderdate,
    o_shippriority
order by
    revenue desc,
    o_orderdate;

The example query above involves three tables: customer (c), orders (o) and line item (l). In a relational database, tables are two-dimensional arrays, where each column of the array has a name, a data type, a data size, and perhaps other attributes. This data can be stored as metadata, e.g., as column and header information. Each table contains a number of columns.

FIG. 4 shows information for columns of tables and types used in the example query. The primary keys (pk), c_custkey and o_orderkey, are unique across their corresponding tables. The foreign keys (fk) reference these primary keys. This is a one-to-many relationship. That is, for a given pk there can be zero or more fk's. To simplify the example, we can assume that all fk's reference valid (existing) pk's This example query and FIG. 4 will be referred to in descriptions below. Embodiments can be extended to all joins (e.g., outer and not involving fk/pk relationships), sub-queries, and queries with Where clause after a Group By clause.

B. Where and Active Flag in Auxiliary Data Structures

Embodiments can use auxiliary tables to store temporary values in the database. The values may be stored temporarily to reduce overall storage, and so as not to add auxiliary columns to the main data tables. Since the system may have to evaluate many queries simultaneously, auxiliary data structures (columns) can be created for each query. The data structure organization can provide for cleanup of the auxiliary columns when they are no longer needed.

In one embodiment, an active flag (AF) structure is created. The AF structure can identify whether a row satisfies a constraint of a Where clause. The AF structure can have various forms, e.g., an array of values that indicate True/False, as may be implemented using single bits. As another example, an index can identify only the rows that satisfy criteria, and thus indicate a True implicitly, and in the case where a small percent of rows are true, would take up far less space.

The Where criteria can specify desired values for a column of a table. When the table is distributed, each node can analyze the column for the rows that the node stores. The rows on a node can be looped through and evaluated based on the Where criteria. In an embodiment, where the AF structure is a column with the same number of rows, each flag can indicate whether the corresponding row satisfies the criteria. If no Where Clause is given, an embodiment can set all flag to True, which may be done by adding those rows to an index.

Figure 5A:
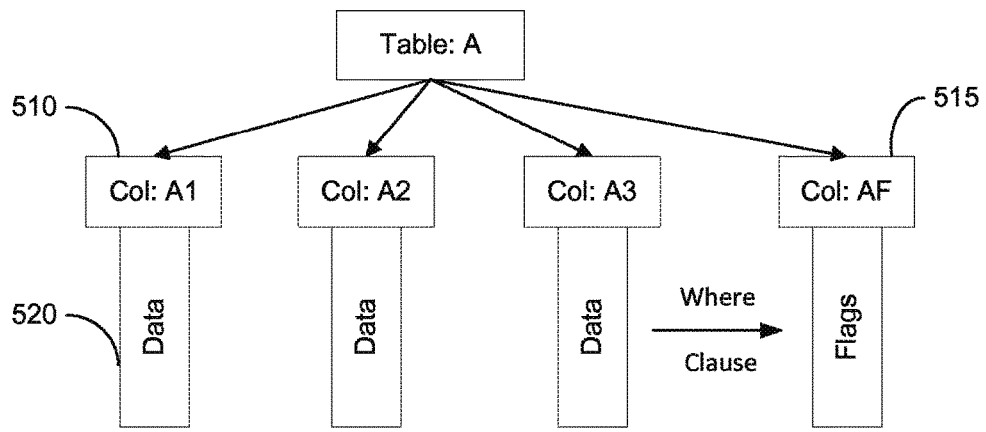
FIG. 5A shows a permanent table A and an active flag structure associated with a query according to embodiments of the present invention.

FIG. 5A shows a permanent table A and an active flag structure associated with a query according to embodiments of the present invention. Table A is shown to have three columns 510 (Col: A1, Col: A2, Col: A3). The data 520 corresponding to each column is indicated below each column. In some figures, the height of the data block can indicate a number of corresponding rows for particular column.

The Where criteria can be applied to the three columns 510 to identify rows that satisfy the criteria. An active field column 515 can store a flag for each row of table A. The flag for the row can identify whether or not that row has satisfied the Where criteria. The active field column 515 can store a 0 for of row, if the row does not satisfy the criteria. And, active field column 515 can store a 1 for of row, if the row does not satisfy the criteria. Active field column 515 is an example of an auxiliary structure.

Active field column 515 can assist in efficiently performing a join operation with another table. For example, only the rows that have been identified as satisfying the criteria can be used in performing the join. Further details on performing a join are discussed later sections.

Figure 5B:
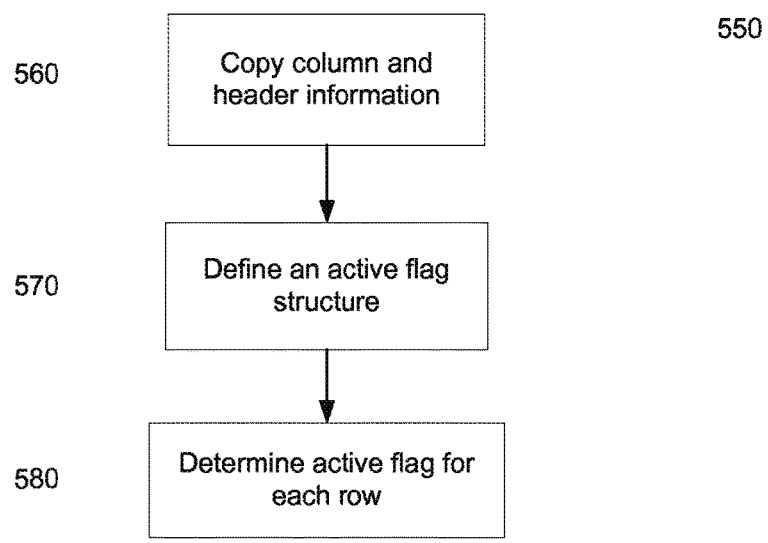
FIG. 5B is a flowchart of a method 550 for creating an active flag structure according to embodiments of the present invention.

FIG. 5B is a flowchart of a method 550 for creating an active flag structure according to embodiments of the present invention. In embodiments storing a table across a plurality of nodes, each node can perform method 550 for the rows that the node stores.

At block 560, a copy of column and header information can be created for executing the query. The column and header information can include any metadata specifying a property of a column. Example column and header information includes a name of each of the columns and a type of data stored in each of the columns. In some embodiments, the column and header information is not needed.

At block 570, the active flag structure can be defined. For example, an active flag column can be created. Such a column can be stored temporarily in association with the main table. The active flag structure can include flag values. An active flag value can be true when the corresponding statement of the WHERE is true, and false otherwise. In one embodiment, the active flag structure can be a new array that through naming conventions or a lookup table (as examples) becomes associated with a particular table, and which has the same row count.

At block 580, then the flags are determined for each row. In one embodiment, an active flag column can be determined by iterating through the rows of the table. If the table was an employee table, the WHERE clause might have a where clause of WHERE employee.age>35. In this case, embodiments can iterate through the employee.age column and set a corresponding active flag values to true if the age of the employee (i.e., employee for a given row) was greater than 35 and false otherwise. The column may be parallelized via OpenMP or a similar parallel methodology in order to efficiently use all cores on a node while executing the where clause constraints.

III. Join Methodology

Embodiments of the join methodology are now described. Diagrams of columns and communication of data are first described, and then a flowchart of a method is described.

A. Related Tables

Figure 6A:
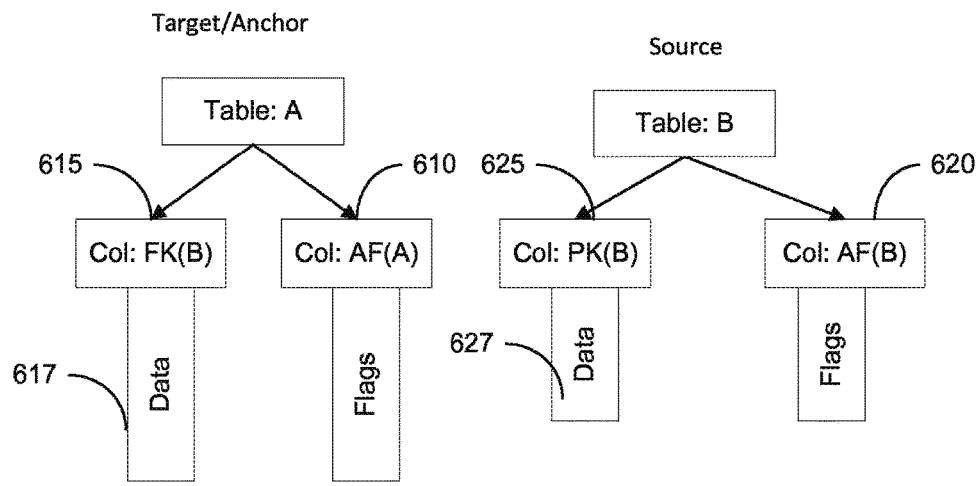
FIG. 6A shows a diagram of target source tables with corresponding active flag structures according to embodiments of the present invention.

FIG. 6A shows a diagram of target source tables with corresponding active flag structures according to embodiments of the present invention. Table A be shown with an active flag column 610 and a foreign key column 615, which is labeled as FK(B) since the foreign key corresponds to table B. Table B has a primary key column 625 and an active flag column 620.

A join can occur between table A in table B. The foreign key in table A can be used to identify the primary key in table B. The number of rows for table B can be different than the number of rows for table A. This is highlighted by a different length of data 617 and data 627.

Table A and table B may be in different nodes of a cluster. Parts of table A and table B may be on a same node, and other parts can be on a different node. The join can use the active flag columns 610 and 620 to perform the join efficiently. Further details about implementation across nodes are generally addressed in section IV.

B. Updating Active Fields

Figure 6B:
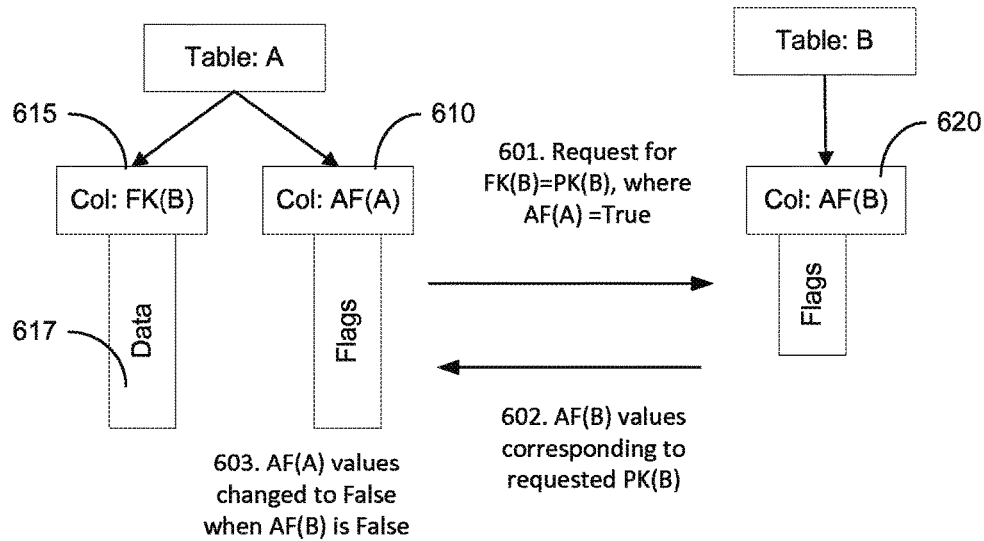
FIG. 6B shows a diagram of using active flag structures as part of a join according to embodiments of the present invention.

FIG. 6B shows a diagram of using active flag structures as part of a join according to embodiments of the present invention. Once the rows having a flag value of True are identified, data 617 of foreign key column 615 can be searched to find foreign key values. Only the foreign key values for the flag values of True are analyzed, thereby making the search of data 617 more efficient. As a reminder, the flag values and active flag column 610 can be determined based on criteria in a Where clause.

At step 601, the foreign keys obtained from data 617 (i.e., the keys corresponding to flag values of True) are used to generate a request for flag values of active flag column 620. The foreign keys correspond to primary keys in data 627 of primary key column 625. The corresponding primary key can be used to identify the corresponding flag value AF(B). At step 602, a flag value AF(B) can be obtained for each foreign key identified in data 617 where AF(A) is true.

The request can be performed in various ways. For example, an RDMA request can be made for active flag column 620 in the case where the remote location is known. Such an example is described in more detail below. In another embodiment, the foreign key can be sent to a routine or node in batches that can search primary column 625 to identify the foreign key data 627. Once the corresponding row is found, the flag value AF(B) corresponding to the row can be checked.

Once the existence of the corresponding key and remote active flag check is complete, flag values AF(A) can be updated. As an example, assume that an employee had an age of greater than 35, where age is a column in table A. Then, the row corresponding to this employee would have a flag value AF(A) that is true. A foreign key column for this employee might include a particular department that the employee works. For example, the employee may work in Engineering. The department value of Engineering can then be used to access table B (which has a primary key of department) to determine the flag value AF(B) for the row corresponding to Engineering in table B. If the flag value AF(B) is false, then that employee does not satisfy the Where criteria and will not be returned as part of the query.

In another embodiment, once at least some of flag values AF(B) of active flag column 620 are received, flag values AF(A) can be updated based on flag values AF(B), at step 603. This may include using explicit values are the lack of any explicit value.

As a result of the update of AF(A), active flag column 610 only has true values for rows that would satisfy the where criteria if a join is actually performed. In this manner, the required data can be identified before actually retrieving and combining the data into a table. The retrieval of the flag value can be much more efficient than the retrieval of data from table B. This is particularly true of the tables are very large and distributed across nodes.

C. Create Joined Table Tables

Once it is known which rows of table A satisfy a criteria for table A and table B, the active flag structure can be used to identify the data needed to create the output table A/B. The output table A/B can be created from the True values of active flag column AF(A). The active flag column AF(A) can be searched for True values. When a True value encountered, addresses for the locations of any data selected by the query can be obtained. For a True value in a particular row, and address can be obtained for each column of data selected for output table A/B. The addresses can be for data from table A and table B.

Figure 7A:
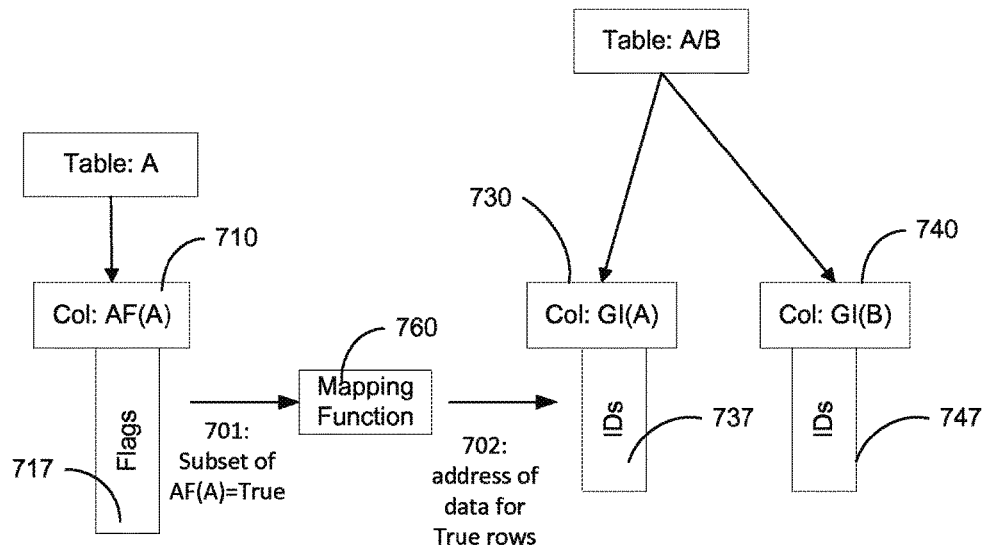
FIG. 7A shows a use of flag values to obtain memory addresses (IDs) for creating an output table A/B according to embodiments of the present invention.

FIG. 7A shows a use of flag values to obtain memory addresses (IDs) for creating an output table A/B according to embodiments of the present invention. An active flag structure 710 is obtained for table A, where the flag values 717 can result from a combination of flag values for criteria of table A and flag values for criteria of table B when a join was successful for a PK/FK.

At step 701, flag values 717 that are true are identified. The rows corresponding to these True values can be known in various ways, such by an array index for the flag value via an explicit value associated with each flag value. Thus, a subset of the flag values and the corresponding rows can be obtained. The identified rows can be provided to a mapping function 760.

Mapping function 760 can be used to determine memory addresses for any selected columns corresponding to be identified rows. For example, mapping function 760 can comprise a hash function and a lookup in a hash table. In another embodiment, mapping function can simply identify the address in a same row of a corresponding column, which may be created from responses from other nodes in performing a previous join or a current join.

The selected columns can be specified in the query. The selected columns can be in table A and/or table B. Mapping function 760 can include a hash function that operates on a key of an identified row. The hash output can be used to look up the address in a hash table, which is indexed based on the hash output values, and thus the memory address can immediately be selected.

At step 702, the memory addresses can be stored in global ID columns 730 and 740. A global ID column can be obtained for each selected column. Thus, a global ID column can exist for each column of table A/B. In another embodiment, IDS 737 and 747 correspond to row numbers of the selected tables, and any data for those rows can be obtained based on the IDs. Thus, one global ID column would be obtained for each table.

For ease of illustration, two global ID columns are shown: one column for table A and one column for table B. Global ID column 730 can correspond to some data that is stored at a same node that is performing the computation, but provides advantage when corresponding to data on a remote node. The IDs 737 can identify memory addresses for data stored in memory associated with the node. In one embodiment using column store, IDs 737 can be stored using a pointer to the address of the top of the column and the rows with True flag values can be used as offsets to the pointer.

In an embodiment of the data from table B stored at a different node, mapping function 760 can provide an ID of the node for each row having a True flag value. The ID for the node can be later used to retrieve the corresponding data. In another embodiment, mapping function 760 can provide a global address for the data from table B, and the current node can use a global address to directly obtain the data. A global address can be obtained for each row.

D. Join Tables

Figure 7B:
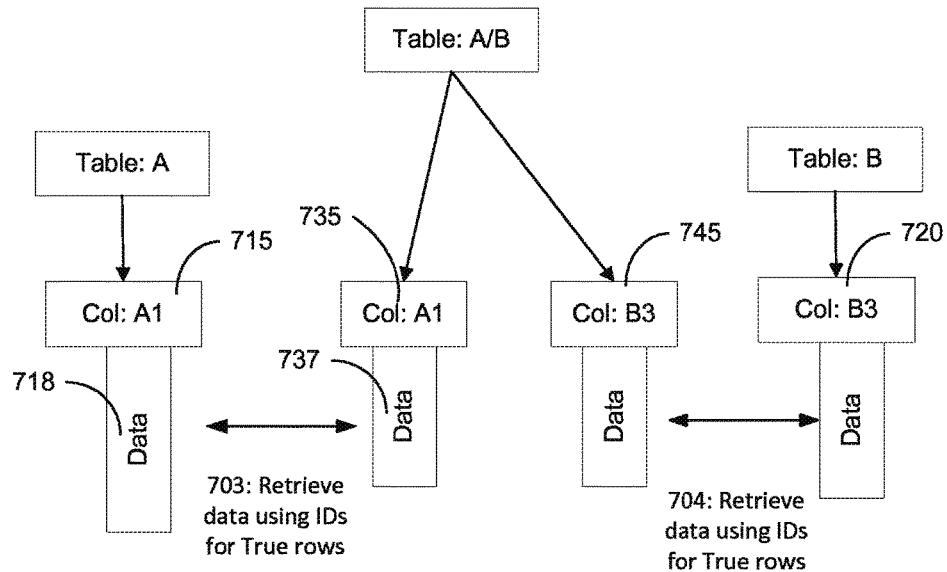
FIG. 7B shows the creation of table A/B from selected data in tables A and B.

FIG. 7B shows the creation of table A/B from selected data in tables A and B. The global ID columns 730 and 740 of FIG. 7A can be used to retrieve data from tables A and B. At step 703, data is retrieved from column 715, which can correspond to a first column of table A. Only certain data corresponding to rows with a True flag value Af(A) are retrieved since these are the rows used to seed table A/B. This retrieval of a subset of the data in the first column of table A is signified by data 718 being longer than data 737.

Figure 8:
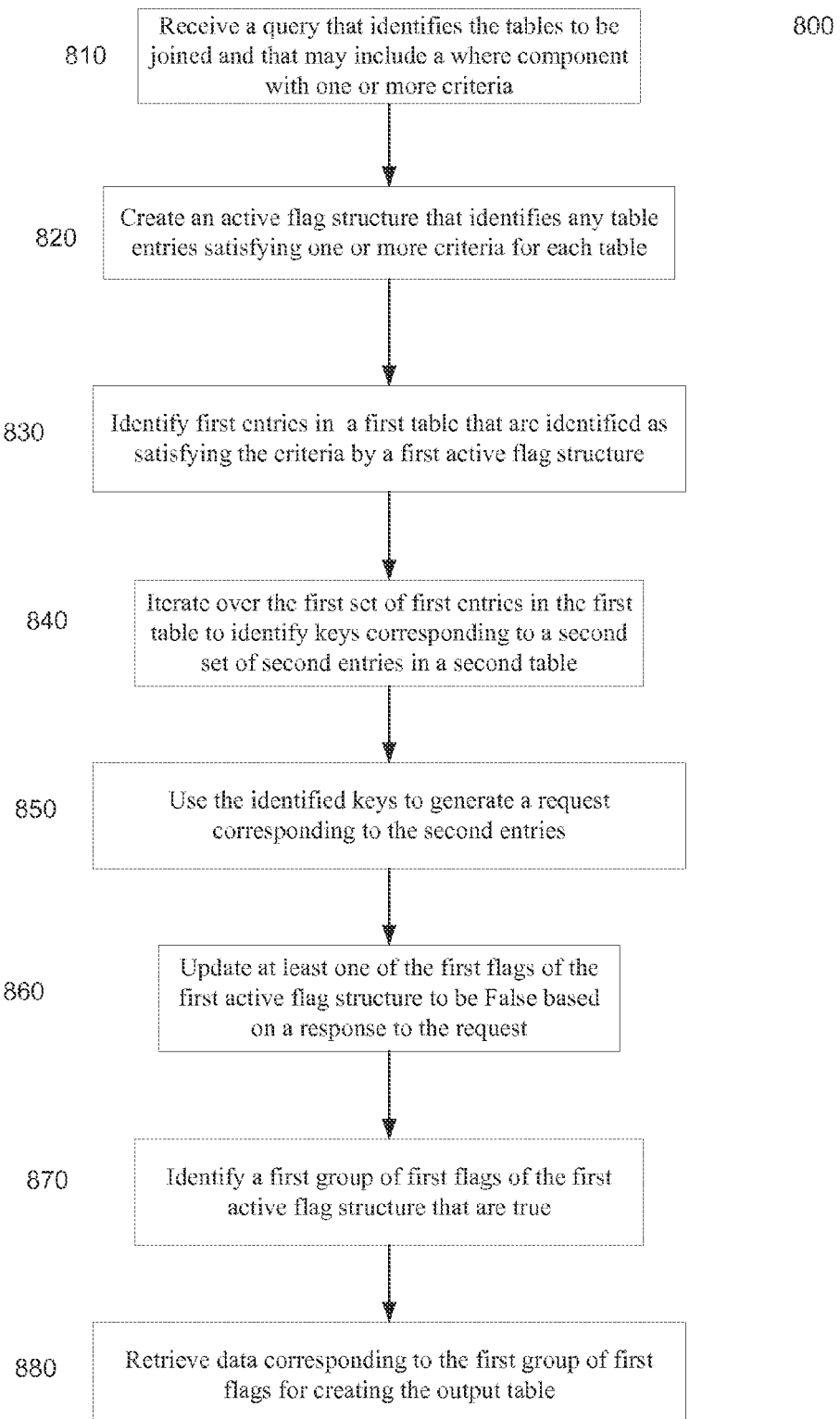
FIG. 8 is a flowchart of a method 800 for performing a join of a plurality of tables distributed across a plurality of computer nodes of a network.

Similarly, at step 704, data is retrieved from column 720, which can correspond to a third column of table B. As mentioned above, the third column can be selected by the query. Because both sides of the join have been evaluated for the where and join, when retrieving related additional fields for the select portion of the query only previously-validated values are brought forth. Thus, in one embodiment, only data that satisfies the Where clause can be retrieved, thereby providing efficiency E. Method of Joining FIG. 8 is a flowchart of a method 800 for performing a join of a plurality of tables distributed across a plurality of computer nodes of a network. Certain steps of method 800 may performed by each of the plurality of computer nodes. Certain steps of method 800 may be performed by particular computer node in preparing part of an output table. System 100 of FIG. 1 may be used to perform method 800. The tables can be distributed across the nodes. In one embodiment, the entire data set can be stored in RAM or a RAM/NAND combination, which can be referred to as an in-memory database.

At block 810, each of the plurality of computer nodes can receive a query that identifies the plurality of tables to be joined. For an example, the example query provided above identifies the tables Customer, Orders, and Lineitem. The query can include a where component with one or more criteria. Each of the computer nodes can perform certain steps to assemble portions of the output table for which the computer node is responsible. As part of assembling portions of the output table, each computer node can request data and flags from other nodes. The flags can be provided as a confirmation of a True status.

At block 820, each of the plurality of tables can be analyzed to identify any entries that satisfy one or more criteria specific to that table. The one or more criteria for a particular table can include a specification to use all entries of the table, which made be made by specifying no restrictions. Each of the plurality of computer nodes can create an active flag structure that identifies one or more table entries that satisfy the one or more criteria and that are stored on the computer node. For example, a first computer node can analyze certain rows of a first table, where the certain rows are stored on the first computer node.

In one embodiment, an active flag structure is only created for one of the tables. In an example that the query does not include a Where clause, the computer nodes can only create a first active flag structure for a first table. The active flag structure can initially have True values for all of the entries of the first table. The first active flag structure can be updated in later steps. In another embodiment where the query does include a Where clause, an active flag structure can be created just for tables for which the Where clause applies.

A computer node can analyze the Where clause and determine which criteria apply to a particular table. The identify criteria can then be used to identify specific columns of the particular table that are subject to criteria. The data in these columns can be analyzed to determine which rows satisfy the criteria. The active flag structures can have any suitable form, e.g., as described herein. In one embodiment, the data is in a column store format so that rows satisfy criteria for that particular column can be identified quickly. Since the data of the particular column are stored sequentially, the data can be accessed with one or few data reads and put into a cache of a processor of a node.

In above example, the where clause includes: (a) Customer: c_mktsegment='BUILDING'; (b) Order: o_orderdate<'1995-03-15'; (c) Lineitems: l_shipdate>'1995-03-15'. A flag structure can be created for each of the three tables based on the criterion specified for that table. And, each node can have each of the three flag structures corresponding to the rows that the node stores.

At block 830, a first computer node can identify a first set of first entries in a first table that are identified as satisfying the one or more criteria. The first computer node can use a first active flag structure for identifying the first set of first entries. The first active flag structure can include first flags operable to indicate which first entries are to be used in an output table. Each computer node can perform a same operation to identify entries stored at each respective computer node.

In one embodiment, the first active flag structure can be a column of True/False bits (flag values), with each bit corresponding to a different row of the table. In this manner, rows at satisfy the one or more criteria for that table can be identified based on the bits in the active flag column. In another embodiment, the first active flag structure can store identifiers of only the rows that satisfy the criteria. Such an active flag structure can act as an index to identify rows at satisfy the criteria.

At block 840, the first computer node iterates over the first set of first entries in the first table to identify keys corresponding to a second set of second entries in a second table. As described above, the keys can correspond to foreign keys, e.g., in a table A. These foreign keys can correspond to primary keys in a table B. First computer node can reserve the analysis only for entries that are identified as satisfying the criteria, e.g., as identified in the first active flag structure. In one implementation, the identification of a key can occur at the same time as determining that the row satisfies the criteria.

At block 850, the identified keys are used to generate a request corresponding to the second set of entries in the second table. In one embodiment, the request is for second flags in a second active flag structure. The second flags correspond to the second set of entries in the second table. Multiple requests can be generated, e.g., one for each of the other computer nodes. Multiple requests can also be generated for each computer node. A portion of the second flags can also be stored at the first computer node. If a second flag does not exist (e.g., because there is no second entry corresponding to a particular key, a value of False (e.g., as identified by "unknown" or "undefined") can be sent in response to the request, or no value can be sent, which can signify a flag is to be changed to false.

In one implementation, the first computer node can collect the identified keys and determine unique values for the identified keys. The unique keys can then be included in the request. In this manner, redundancy can be removed from the request. All of the unique keys corresponding to a second computer node can be sent in a single request to the second computer node (e.g., using a point-to-point MPI communication). The ID of the second computer node can be determined based on a hash map. The ID of the second computer can be stored in a permanent or temporary column of the first table and be associated with the second table. When a particular key does not correspond to an entry of the second table, a value (e.g., NULL) can be stored in the column to indicate that the corresponding second entry does not exist.

In another implementation, a separate request can be generated for each of the identified keys. For example, each identified key can be mapped to a global address of a second flag corresponding to the identified key. The global address can be used to directly access memory (e.g., using RDMA) of another computer node to obtain the second flag value. The global addresses can be stored as IDs in a in a permanent or temporary column associated with the first table. When a particular key does not exist, the ID can indicate that no address exists.

A second computer node can receive a request, e.g., one that includes a set of identified keys or rows. The second computer node can have generated the second active flag structure based on the query, which can specify criteria directed to the second table. The second computer node can retrieve the second flags corresponding to the requested keys or rows. When the second computer node receives keys as a request, the second computer node can analyze the primary key column to identify the corresponding rows. In some embodiments, the first computer node can identify the rows and second table (e.g., using a hash table), and thus the second computer node does not have to convert the requested keys to specified rows.

At block 860, the first computer node can update at least one of the first flags of the first active flag structure to be false based on a response to the request. Separate requests can be sent to particular nodes or to global memory addresses at particular nodes. Thus, separate responses can be received from each node or for each memory request to a particular global memory location. In one embodiment, the response can be False for a particular key when there is no corresponding second entry in the second table, or no value might be received corresponding to the particular key. Either type of response can cause an update of a first flag to False. Updating a first flag to be false can be performed by removing the first flag from the first active flag structure.

In one embodiment, the response can include an ID (e.g., a remote row location) for the corresponding second entry. For example, the response can indicate a node that stores the entry, e.g., when the request is broadcast to all nodes. As another example, the response can indicate a particular row number of a particular second entry at a second node.

As mentioned above, the request can be at least partially for second flags of a second active flag structure. In one implementation, the first computer node can update any first flags of the first active flag structure to be False when a corresponding second flag is False. The first computer node can receive the requested second flags from one or more other computer nodes, as well as retrieve the second flags from its own storage. The first computer node can identify second flags that are False. When this occurs, the first computer node can update the corresponding first flag to be false. The corresponding first flag would be associated with the row that has a key corresponding to the second flag, e.g., the key is a primary key of the second table.

At block 870, subsequent to the updating, a first group of first flags of the first active flag structure that are true are identified. This analysis can be done after multiple updates of different active flag structures. For example, the first flags of the first active flag structure can be updated based on flags for other tables. As another example, the first flags can be used to update other flags of other tables. For example, the first flags can correspond to a table B and the second flags correspond to a table C. The first flags can then be used to update a table A that is an anchor table for the join.

At block 880, data corresponding to the first group of first flags is retrieved for creating the output table. The output table can then be created. The data can be retrieved later various mechanisms, e.g., as described in FIGS. 7A and 7B. A temporary address column (e.g., column 730 and 740 of FIG. 7A) can be created for each column of the output table. The temporary address columns can be populated with IDs that specify an address for obtaining data of a particular column of a particular table. The first computer node can be programmed with the mapping function that determines the IDs.

In one embodiment, the first time a data set is loaded into the primary storage (e.g., RAM or RAM/NAND), hash maps are created for how the tables are distributed across the network. These hash maps can be used as a mapping function. Examples of hash tables are described in Introduction to Algorithms $3^{rd}$ Ed., by Cormen et al., 2009, pages 253-257.

After the data is retrieved, an intermediate table can be created. This intermediate table can be subject to additional operations, e.g., "group by," "order by," and "Select."

IV. Parallel Join Across Nodes

As mentioned above, some of the tables are small and can easily fit into RAM or RAM/NAND on a single machine, but some are so large that they can only fit into RAM or RAM/NAND when distributed across multiple machines. It is possible for a database administrator to classify tables as small or large or this classification into small and large can be done automatically. Small tables can be duplicated and copied to each of the nodes of a cluster. This means they are available for use on any node without network requests or communication. Large tables (usually tables that are too large to fit in one machine) are distributed across a cluster with no duplicate copies of the data), assisting for example, in RDMA requests.

When tables are distributed across a cluster, there needs to be a systematic way of knowing how to distribute and access them. One way of achieving this is to associate with each table a unique cluster partition key. This could be based on any column in the table including a special column added for this purpose. Most database tables have a primary key (pk) which is unique for each row of the table. The pk can be used to map the rows of a table to unique nodes in the cluster. And, the pk can be used in combination with a particular column to determine a global address for a particular row with the particular column of a table. For example, the start of a column on a particular node can be mapped, and the pk can be used to access a particular row (e.g., once the pk is used to identify a particular node that stores the row).

A. Global Address and Merging Active Fields

Figure 9A:
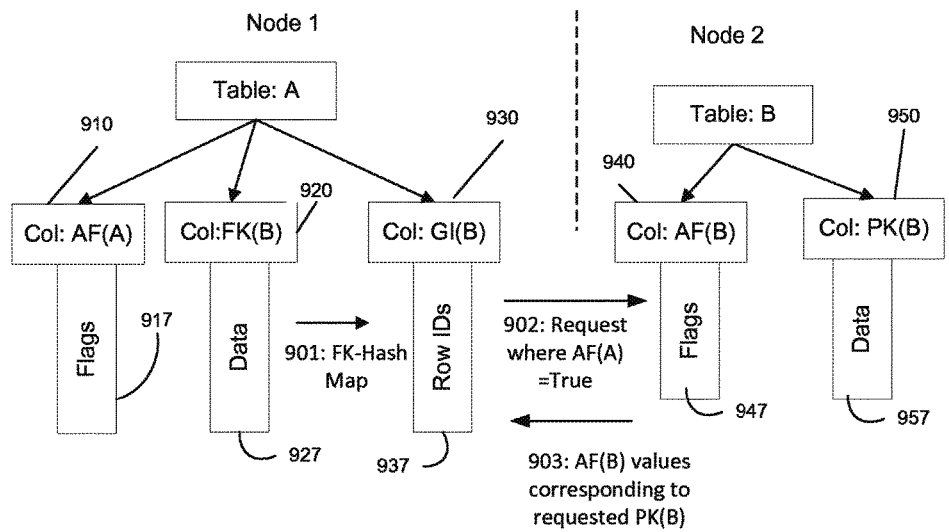
FIG. 9A shows communication between nodes using direct memory access to obtain flag values according to embodiments of the present invention.

FIG. 9A shows communication between nodes using direct memory access to obtain flag values according to embodiments of the present invention. This example is also directed to joining of tables A and B using the pk/fk relationship, where A is the anchor. At this stage, it is assumed that permanent tables A and B are distributed among the nodes, and certain query auxiliary data structures are determined (e.g., active field structures).

Node 1 stores a portion of table A. An active field structure 910 has been created and includes first flags 917. As active field structure 910 is associated with table A, it is shown underneath table A, even though active field structure 910 is not be a permanent column of table A. One permanent column of table A is column 920, which is a foreign key to table A. The data 927 of column 920 can correspond to a primary key of table B. Table B is shown as having a primary key column 950 that includes primary key data 957.

Global ID column 930 includes IDs (e.g., memory addresses) corresponding to rows of foreign key column 920. For example, a row of global ID column 930 can be a memory address for a row of primary key column 950 that corresponds to a row in foreign key column 920. The IDs 937 can be in various forms. In one embodiment, GI denotes a global row ID (e.g., 64 bit integer) that is composed of a node ID in a local row ID. The node ID corresponds to a particular node that stores the row (pk) of table B. The local row ID corresponds to the row number of the pk in the portion of table B stored on a particular node.

At step 901, a hash map can be used to obtain any ID 937 corresponding to a foreign key of a row in data 927. In one implementation, the hash map is only applied to rows in foreign key column 920 that have a flag 917 that is True. In this manner, the hash map is only applied to obtain data that is needed the join. Thus, in one embodiment, global ID column 930 can be generated dynamically for a query. In another embodiment, global ID column 930 can be generated and stored permanently for use with any query. The rows of global ID column 930 can be accessed to obtain the IDs. In one implementation, the hash function can include mapping the foreign key to a hash value, which can be used to look up an ID in a hash table.

At step 902, a request is sent from node 1 to node 2 for second flags 947 of active flag structure 940 of table B. In one embodiment, the request can be a direct memory access to global memory of node 2. An individual request can be made for each row where flag 917 is True. The IDs 937 can specifically correspond to flags 947, as can be specified by the hash map.

In another embodiment, the request can be made to the operating system of node 2, and node 2 can obtain the requested flags and send them back to node 1. The request to node 2 can be a single request that includes all of the row IDs 937 that correspond to flags 917 that are True.

In another implementation, unique values of the foreign keys for rows at satisfy the criteria can be identified, and a request can include only the unique foreign keys. Node 2 can use the row IDs to retrieve the flags 947 identified by the request as part of a single batch operation.

At step 903, the flag values 947 (designated as AF(B)) are sent to node 1. Node one can use the received flags 947 to update flags 917. For example, if the corresponding flag 947 is False then the corresponding flag 917 can be changed to False from True (flag 917 would initially be True for a request to be made). Flag 947 being false would indicate that the corresponding data from table B is not satisfy the criteria of a Where clause, and thus the corresponding row of table A does not satisfy all the criteria of the Where clause.

The hash map from the foreign key to an ID (e.g., a node ID) of table B can be built independently on each node. Accordingly, the same process can be performed for any of the nodes. And, the hash map can be used for any query. In some instances, a portion of table A and a portion of table B can be stored in the same node. Left outer, right outer, and full outer joins would be performed in the same manner, however, they would instantiate a NULL on the respective side where there is no match for the resulting table.

It can be assumed that the foreign keys are unique and hence the mapping is unique. As long as the pk of a table is not modified, the hash map (e.g., in step 901) does not need to be created again nor updated. The initial formation of the hash map may be done at table load time, or on demand. Hence, embodiments can first check to see if the hash has already been constructed. If it is, embodiments can skip this step. Otherwise, this step is done.

If this step is done on tables derived from the permanent tables, then the hash can be constructed and saved in the permanent tables' data structure, so as to be accessible by future queries. Formation of a hash map does not require any parallel communication and thus can be computed in parallel efficiently. Moreover, it can be performed thread parallel using a suitable hash module.

B. Node-Node Communications

Figure 9B:
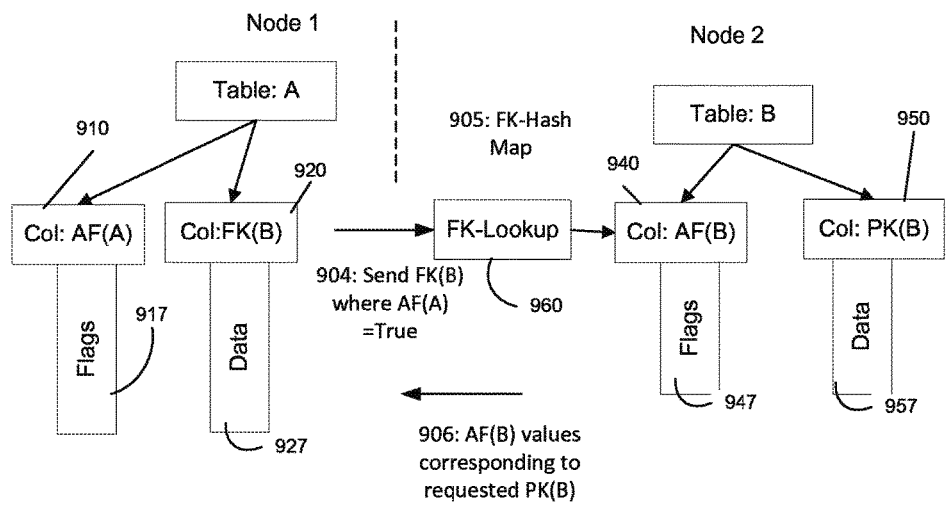
FIG. 9B shows point-point communication to obtain flag values corresponding to a foreign key according to embodiments of the present invention.

FIG. 9B shows point-to-point communication to obtain flag values corresponding to a foreign key according to embodiments of the present invention. This example is also directed to joining of tables A and B using the pk/fk relationship, where A is the anchor. At this stage, it is assumed that permanent tables A and B are distributed among the nodes, and certain query auxiliary data structures are determined (e.g., active field structures).

In this example, node 1 also identifies foreign keys that have a flag 917 that is True. The foreign key values for rows at satisfy the criteria can be used to identify a node that stores the corresponding data of table 2. A global ID column can be created that identifies the corresponding node for each row that has a True flag. Then, the unique foreign keys for rows stored on a particular node can be gathered to send in a request to that node.

At step 904, a request is sent from node 1 to node 2. The request can include any unique foreign keys that correspond to rows where flag 917 is True. An auxiliary data structure or permanent column can include the identification of which node stores the corresponding data from table B for any given row of table A. The data structure can have the form of global ID column 930. If the auxiliary data structure indicates that the corresponding node is node 1 (the local node), then a lookup (e.g., using an index, B-Tree, hash table etc.) can be can be used to convert the foreign key to a row number for retrieving the corresponding flags 947 that are stored on node 1.

At step 905, node 2 can receive the request and perform a FK-lookup 960 (e.g., using an index, B-Tree, hash table etc.) converts each of the foreign keys to a particular row of table B. As examples, the output of FK-lookup 960 can provide a particular row of primary key column 950 or active flag column 940. When FK-lookup 960 provides a memory address for a particular flag 947, the flag can be retrieved with no intermediate steps. When FK-lookup 960 provides a particular row of primary key column 950, an additional lookup to active flag column 940 is performed.

At step 906, the flags 947 that correspond to the requested foreign keys can be sent from node 2 to node 1. Node one can then update active flag column 910. In one embodiment, a memory address of a row determined from FK-Lookup 960 can also be returned so that node 1 can use the memory address for future requests.

Due to the communication cost, embodiments can construct a global ID column on demand. In one implementation, each entry in global ID column can be initialized to "unknown". Then for a given query, node 1 can iterate over the active A entries (i.e., AF(A)=True). If a corresponding ID is unknown, then node 1 can send a request to the mapped node that stores the identified row of table B. The mapped node can then map the key to a row number. When the row number (or other memory address) is returned, it is store in the global ID column for this query and future queries. If the return value from node to is "undefined," then no pk exists for that fk.

Regardless of how a global ID column is created what the IDs of the column are, the IDs can be used to obtain active flags for Table B, or whatever table the global ID column corresponds to. In one implementation, the ID provides both the node number and the row number within that node. The retrieval of the corresponding flag values can use remote node access. This may be performed either using Remote Direct Memory Access (RDMA) via an RDMA-get, or peer-to-peer communication using MPI (Message Passing Interface). RDMA-get is simple, but must be done one row at a time, while peer-to-peer communication can be done in bulk, but requires coordinated communication. Either method can be used.

C. Joining Tables

As described above, node one can obtain a global ID column that identifies rows from table A to be used in responding to the query. These IDs would correspond to data that is stored on node 1. Another global ID column can identify rows from table B to be used in responding to the query. These IDs can correspond to data at other nodes, as well as node 1. The global ID columns can then be used to fetch the data.

A management node can assemble the join tables from the plurality of nodes into the final output table. This assembly can be done no further processing is performed. Other embodiments can perform for the processing before assembling the subparts of the final table from the respective nodes.

V. Group by and Order by

After one obtains the joined table, further processing can be performed. For example, embodiments can process the "group by" clause. At the point of the Where clause and the two joins a being done for the example query, a result can be a temporary table that has node/row ids for the three tables, namely customer (c_), order (o_) and lineitem (l_), across the cluster nodes, namely: Table COL: c_Id, o_Id, l_Id.

Each node can gather (collect from the cluster) the required columns, namely l_orderkey, o_orderdate, o_shippriority, l_extendedprice, and l_discount. The data for these columns can be collected using RDMA-get or bulk peer-to-peer collection, as outlined above.

In a next step, an aggregation table can be created. In one embodiment, on each node, a new empty table is created. The new empty table can be called AGGR (or destination table), with columns: Table AGGR: l_orderkey, o_orderdate, o_shippriority, revenue. The columns identified in the Select statement of the example query.

One embodiment can also create an empty hash map to map the triplet key (l_orderkey, o_orderdate, o_shippriority) to a row id into the AGGR table. Each node can iterate over the rows of the ID columns, and collect the values l_orderkey, o_orderdate, and o_shippriority into a buffer. The buffer is used as a key into the hash map. If the key is not found, then the next row id is considered as the value of the hash, and the hash map is updated with this key value pair. Moreover, table AGGR is expanded by one, and its new row is initialized. Then the values l_orderkey, o_orderdate, and o_shippriority are stored in the new row.

This step can be performed separately and independently on each node. Embodiments can implement this step thread parallel, which requires locking of the hash table entries on access, and row id when incrementing.

Then, aggregation can be performed across nodes. For example, once the AGGR table is completed on each node, a management node can aggregate the values across the cluster. The management node can be one of the data nodes. It can be assumed that the resulting AGGR tables are significantly smaller than the original source tables. As such, a simple method for aggregation can be used. In one embodiment, on all nodes except node 1, each node loops over the rows of AGGR, and send the contributions to node 1, which will add to its table. Peer-to-peer medications can be used for the purpose of obtaining the accumulated table.

On the node with the accumulated table, the node can sort the entries of the accumulated table based on columns revenue (in descending order) and o_orderdate (in ascending order). And then, the node can output the first 10 rows in the order: l_orderkey, revenue, o_orderdate, and o_shippriority.

VI. Multiple Table Joins

Multiple joins can be performed, for each join can be performed as described herein. Thus, once we have joined tables A and B into AB, we can join it with table C. Four cases for in order to perform the two joins are considered below. The order the joins can affect performance, but the end result is not change. Joining A and B, and then C is equivalent to joining B and C, and then A. But, before the cases are discussed, a general diagram is described.

Figure 10:
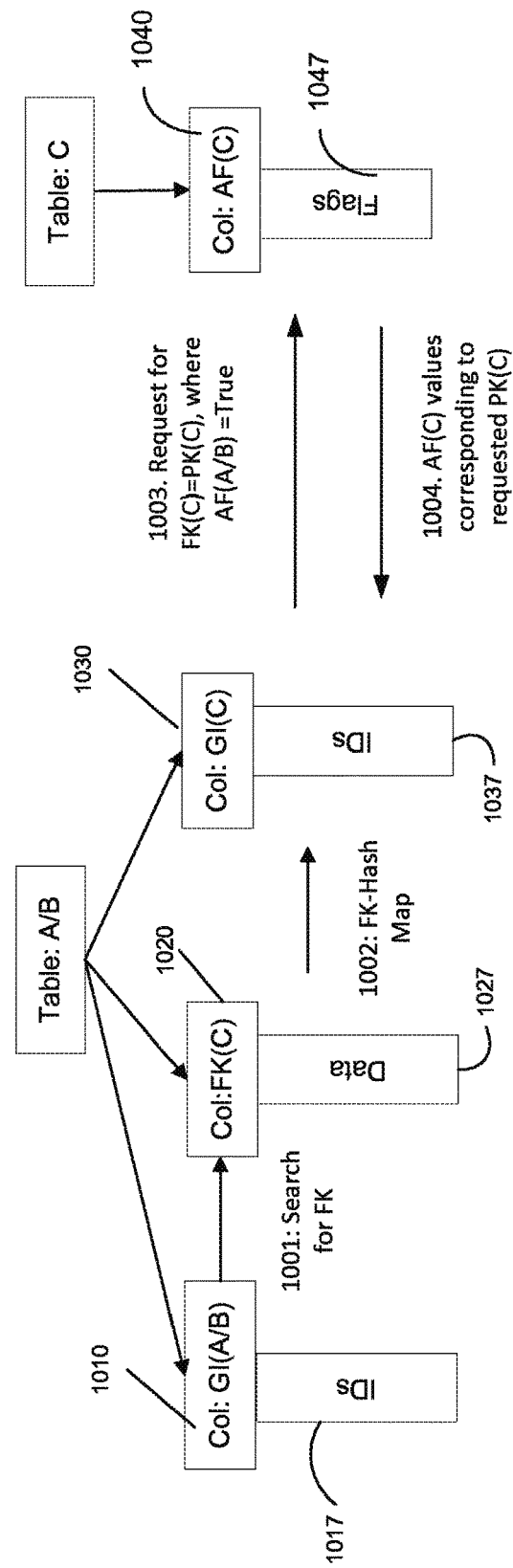
FIG. 10 shows the second join according to embodiments of the present invention.

FIG. 10 shows the second join according to embodiments of the present invention. At this point, a first join has joined tables A and B to create an intermediate table A/B. One of the columns of this intermediate table includes a column that refers to table C, e.g., via a foreign key. Global ID column 1010 includes IDs 1017 that can be used to determine a foreign key column 1020 and its corresponding data 1027. In another embodiment, a column in table C can refer to one of tables A or B.

At step 1001, IDs 1017 can be used to identify rows that have survived the Where criteria for tables A and B. IDs 1017 can then be used to access a foreign key column corresponding to those rows.

At step 1002, a hash table index (if it exists) can be used to map the foreign keys in data 127 to IDs 1037 of global ID column 1030. IDs 1037 can specify nodes that store respective rows of table C. In another embodiment, IDs 1037 can specify specific memory addresses corresponding to rows or two active flags for those rows.

At step 1003, a request is generated to obtain third flags 1047 of active flag structure 1040. The request can be formatted in various ways, e.g., as described herein. The request would only be for rows where and active flag structure AF(A/B) is True. In one embodiment, rows where AF(A/B) were False can already have been removed, and thus all IDs 1037 can be used.

At step 1004, the third flags 1047 are retrieved. The retrieval of the third flags can be accomplished by retrieving only True values, which may be accompanied by a memory location of the corresponding data. The confirmation of the true values can be accomplished in any suitable way, and can convey that a corresponding third flag is True. These third flags 1047 (e.g., any value confirming a True) can be used to update the active flag structure AF(A/B). The update flag structure can specify all the rows that survive the Where criteria for tables A, B, and C. The joins can be performed in various orders, some of which are now described.

A. Case 1. Update on A.aPk=C.aFk

In this case, table C will be the anchor. The tables are joined based on the primary key of A in the AB table being a foreign key in table C. A primary key AB.aPk of table AB can be obtained from an ID column AB.aId. This can be done using a hash map that provides AB.aId directly or that provides a node from which AB.aId can be obtained. AB.aId could just be a node number. This retrieval can be done via RDMA get or peer-to-peer communication.

This embodiment can proceed exactly as in the previous join with tables AB feeding into table C. For example, a hash map can be obtained to determine a memory address for a primary key of AB. The hash map is used to determine an ID for the foreign key in table C. The ID can then be used to obtain the active flags AF(A/B). The active flag structure AF(C) can then be updated, as described herein. The tables can then be joined using the updated active flag structure AF(C).

B. Case 2. Update on B.bPk=C.bFk

In this case, table C will be the anchor. The tables are joined based on the primary key of B in the AB table being a foreign key in table C. This process can proceed in a same manner as in Case 1.

C. Case 3. Update on C.cPk=A.cFk

In this case, table AB will be the anchor. The tables are joined based on the primary key of C in table C being a foreign key in table AB taken from table A. This is one example as covered by FIG. 10. The foreign key column of A can be brought in from table A to table AB. We will call this new column AB.cFk. A global ID column AB.aId can be used find the node and corresponding row number for the primary key in table C. Then, global ID column AB.aId can be used to obtain the third flag values of active flag structure AF(C), which can be ued to update AF(B). Now that the surviving rows are identified, the data can be collected.

D. Case 4. Update on C.cPk=B.cFk

In this case, table AB will be the anchor. The tables are joined based on the primary key of C in table C being a foreign key in table AB taken from table B. This is similar to Case 3, except we start with a foreign key column in table B.

E. Example

In the example query above, there are two table joins: (1) c_custkey=o_custkey; and (2) l_orderkey=o_orderkey. These can be processed sequentially, starting with 'c_custkey=o_custkey'. This table join may be implemented as follows. The first table can be the Order table (Order is referred to as the anchor table of this join). For those rows that pass the where clause constraint, use the Order's foreign key (o_custkey) and find the corresponding c_custkey in the Customer table. If the identified second entries has also passed its where constraint, then update the rows from the two tables, otherwise disregard this and move to the next Order row. Then do the same between the Order and Lineitem tables, using the Lineitem table as the anchor. The end result is a single table containing data from all three source tables, which have passed the where clauses constraints.

A node can then process the "group by". For example, the rows of the resulting table of Step 140 can be aggregated in this process. The rows with unique triplet (l_orderkey, o_orderdate, o_shippriority) are collected. The end result is a smaller table, with four entries l_orderkey, o_orderdate, o_shippriority and revenue.

Once an intermediate table is obtained, a sort can be performed the table using "order by". For example, the table can be sorted first in descending order on revenue and ascending order on o_orderdate. The final table can be output based on the "select" clause. For example, the first 10 row of the resulting table can be written out in the order: l_orderkey, revenue, o_orderdate, and o_shippriority VII. Results Embodiments perform competitively. In a TPC-H Benchmark SF=100 (www.tpc.org/tpch), computational time was reduced. Using 16 cores, a first pass on a single node took 4.7 seconds, and 3.86 seconds on two nodes. A second pass took 3.04 seconds on a single node, and 2.39 seconds on to nodes. These compare favorably to a MonetDB average time of 8.2 seconds on a single node.

VIII. Computer System

Figure 11:
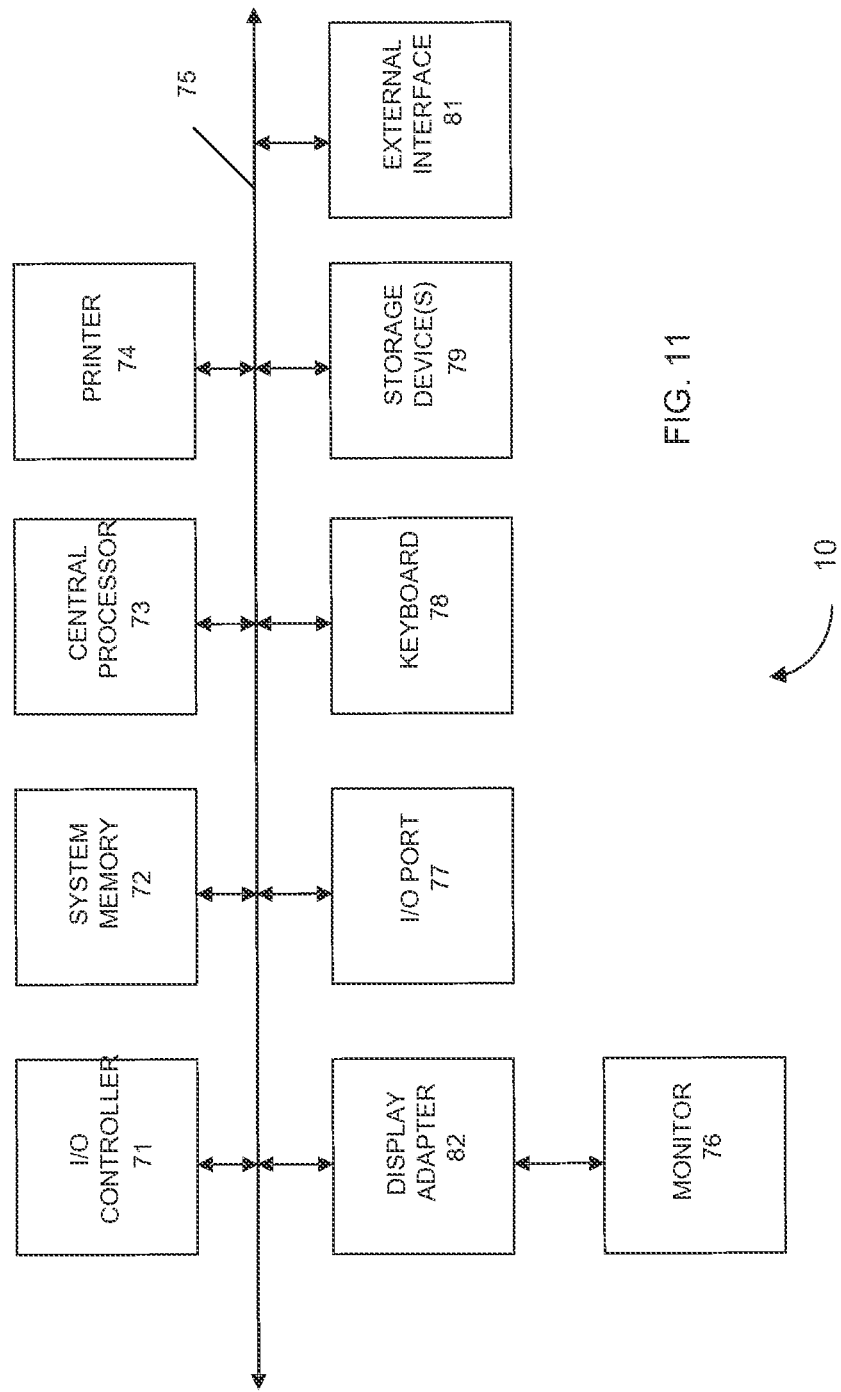
FIG. 11 shows a block diagram of an example computer system 10 usable with system and methods according to embodiments of the present invention.

Any of the computer systems mentioned herein may utilize any suitable number of subsystems. Examples of such subsystems are shown in FIG. 11 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 11 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 977 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of performing a join of a plurality of tables distributed across a plurality of computer nodes of a network, the method comprising:
   receiving, at each of a plurality of computer nodes, a query identifying a plurality of tables to be joined;
   for a first table of the plurality of tables:
      determining, by each of the plurality of computer nodes, whether table entries of the first table stored on the computer node satisfy one or more criteria corresponding to the query;
      creating, by each of the plurality of computer nodes, a first active flag structure including first flags;
      setting, by each of the plurality of computer nodes, each of the first flags of the first active flag structure to indicate a true value in response to the determination that a corresponding table entry satisfies at least one criterion of the one or more criteria;
      identifying, by a first computer node of the plurality of computer nodes, a first set of first entries in the first table, each of the first entries having been determined as satisfying the at least one criterion of the one or more criteria and each of the first flags being operable to indicate that a corresponding first entry is to be used in an output table;
      iterating, by the first computer node, over the first set of first entries in the first table to identify keys corresponding to a second set of second entries in a second table, the second table being one of the plurality of tables;
      using the identified keys to generate a request corresponding to the second set of second entries in the second table;
      updating, by the first computer node, at least one of the first flags of the first active flag structure to indicate a false value based on a response to the request;
      subsequent to the updating, identifying a first group of the first flags of the first active flag structure that indicate the true value; and
      retrieving data corresponding to the first group of the first flags for creating the output table;
   performing, by each of other computer nodes:
      identifying a respective set of entries in the first table that are identified as satisfying the one or more criteria by the first active flag structure;
      iterating over the respective set of entries in the first table to identify respective keys corresponding to a respective second set of entries in the second table;
      using the respective keys to generate respective requests corresponding to the respective second set of entries in the second table;
      updating any respective first flags of the first active flag structure when a respective response indicates the false value;
      subsequent to the updating any respective first flags, identifying a respective group of the first flags of the first active flag structure that are true; and
      retrieving data corresponding to the respective group of the first flags to create the output table; and
   creating a hash map specifying where entries of the first table are stored.

2. The method of claim 1, wherein the request includes a plurality of separate requests, the method further comprising:
   determining, by the first computer node, an identifier for each of the identified keys, the identifier specifying a memory location for a corresponding second entry; and
   sending, by the first computer node, the separate requests based on the identifiers.

3. The method of claim 2, wherein determining the identifier includes using a hash function operation on an identified key.

4. The method of claim 2, wherein the identifiers specify computer nodes of the plurality of computer nodes, and wherein each separate request is sent from the first computer node to another computer node.

5. The method of claim 4, wherein communication between the first computer node and the other computer nodes is performed using message passing interface (MPI).

6. The method of claim 4, further comprising:
   analyzing the identified keys having identifiers corresponding to a second computer node to determine unique keys; and
   including the unique keys in the separate request for the second computer node.

7. The method of claim 6, wherein a separate response from the second computer node includes row identifiers corresponding to second entries of the second table that satisfy one or more second criteria for the second table, the method further comprising:

saving the row identifiers associated with the first set of first entries; and using the row identifiers in retrieving the data corresponding to the first group of the first flags.

8. The method of claim 2, wherein the identifiers specify memory addresses of data, and wherein each separate request is sent from the first computer node to memory of another computer node that stores a corresponding second entry of the second table.

9. The method of claim 8, wherein the separate requests are sent via remote direct memory access (RDMA).

10. The method of claim 1, wherein the response includes a value of False corresponding to a key for each of the at least one of the first flags or no value corresponding to a key for each of the at least one of the first flags.

11. The method of claim 1, wherein the request is at least partially for second flags in a second active flag structure, and wherein a first flag is updated to be false when a corresponding second flag is false.

12. The method of claim 1, wherein the query includes a where component with one or more where criteria.

13. The method of claim 12, further comprising:

for each of the tables of the plurality of tables:

creating, by each of the plurality of computer nodes, an active flag structure that identifies one or more table entries that satisfy the one or more criteria and that are stored on the computer node.

14. The method of claim 1, wherein the keys in the first table are foreign keys for the second table.

15. The method of claim 1, wherein creating the hash map includes:

defining a function that maps primary keys to nodes.

16. The method of claim 1, wherein creating the hash map includes:

populating an array using a uniform distribution with random numbers between 0 and N−1, where N is a number of computer nodes of the network; and using the random numbers to distribute the first table.

17. The method of claim 16, further comprising:

if a computer node goes offline, replacing all numbers for the computer node that goes offline with numbers for at least a portion of other computer nodes.

18. The method of claim 1, further comprising:

collecting the data corresponding to the first group of the first flags and corresponding to the respective group of the first flags from the plurality of computer nodes to create the output table.

19. The method of claim 1, wherein the first active flag structure is a column of true/false bits and wherein each bit of the true/false bits correspond to a different row of the first table.

20. The method of claim 1, wherein the response to the request is received from a second computer node of the plurality of computer nodes.

21. A non-transitory computer product comprising a computer readable medium storing a plurality of instructions that, when executed by a computer, cause the computer to perform operations comprising:

receiving, with one or more processors, at each of a plurality of computer nodes, a query identifying a plurality of tables to be joined;

for a first table of the plurality of tables:

determining, with the one or more processors, by each of the plurality of computer nodes, whether table entries of the first table stored on the computer node satisfy one or more criteria corresponding to the query;

creating, with the one or more processors, by each of the plurality of computer nodes, a first active flag structure including first flags;

setting, with the one or more processors, each of the first flags of the first active flag structure to indicate a true value in response to the determination that a corresponding table entry satisfies at least one criterion of the one or more criteria;

identifying, with the one or more processors, by a first computer node of the plurality of computer nodes, a first set of first entries in the first table, each of the first entries having been determined as satisfying the at least one criterion of the one or more criteria and each of the first flags being operable to indicate that a corresponding first entry is to be used in an output table;

iterating, with the one or more processors, by the first computer node, over the first set of first entries in the first table to identify keys corresponding to a second set of second entries in a second table, the second table being one of the plurality of tables;

using, with the one or more processors, the identified keys to generate a request corresponding to the second set of second entries in the second table;

updating, with the one or more processors, by the first computer node, at least one of the first flags of the first active flag structure to indicate a false value based on a response to the request;

subsequent to the updating, identifying, with the one or more processors, a first group of the first flags of the first active flag structure that indicate the true value; and retrieving, with the one or more processors, data corresponding to the first group of the first flags for creating the output table;

performing, by each of other computer nodes:

identifying, with the one or more processors, a respective set of entries in the first table that are identified as satisfying the one or more criteria by the first active flag structure;

iterating, with the one or more processors, over the respective set of entries in the first table to identify respective keys corresponding to a respective second set of entries in the second table;

using, with the one or more processors, the respective keys to generate respective requests corresponding to the respective second set of entries in the second table;

updating, with the one or more processors, any respective first flags of the first active flag structure when a respective response indicates the false value;

subsequent to the updating any respective first flags, identifying, with the one or more processors, a respective group of the first flags of the first active flag structure that are true; and retrieving, with the one or more processors, data corresponding to the respective group of the first flags to create the output table; and creating, with the one or more processors, a hash map specifying where entries of the first table are stored.

* * * * *